(No Model.)

W. M. WILKIN.
SAW RELIEF MECHANISM FOR SAW MILLS.

No. 286,356. Patented Oct. 9, 1883.

Witnesses.
W R Edelen
Robt H Porter

Inventor
Wm M Wilkin
Per Hullock & Hullock
Att's

UNITED STATES PATENT OFFICE.

WILLIAM M. WILKIN, OF EAST SAGINAW, MICHIGAN.

SAW-RELIEF MECHANISM FOR SAW-MILLS.

SPECIFICATION forming part of Letters Patent No. 286,356, dated October 9, 1883.

Application filed April 18, 1883. (No model.)

*To all whom it may concern:*

Be it known that I, WILLIAM M. WILKIN, a citizen of the United States, residing at East Saginaw, in the county of Saginaw and State of Michigan, have invented certain new and useful Improvements in Saw-Relief Mechanism for Saw-Mills; and I do hereby declare the following to be a full, clear, and exact description of the invention, such as will enable others skilled in the art to which it appertains to make and use the same.

This invention relates to circular saw-mills; and it consists in providing means for relieving the saw from too great friction on the side of the cant both while sawing and while gigging, and thereby preventing what is called "burning the center of the saws."

When a large circular saw is made hot by friction on its side, by rubbing upon the cant it becomes dished, and if this occurs while sawing it causes the saw to deviate and make bad work, and the more it deviates the greater becomes the friction upon its center, and of course it becomes still more heated. Then, again, a saw will often be sprung while at work and cut out of line, but would recover itself if the unevenness in the side of the cant thus caused could pass the saw center without causing undue friction.

It is the object, therefore, of this invention to provide means for relieving the saw from this friction, and this is accomplished by allowing its arbor to have a slight longitudinal movement, thus giving the saw a slight lateral play. This longitudinal movement of the saw-arbor is opposed by a spring, so that it will only admit the saw to move laterally when the pressure is sufficient to overcome the spring; and devices are also provided so that the sawyer may move the saw-arbor longitudinally at pleasure; and I also provide means whereby the sawyer may throw the saw to one side whenever the gigging of the carriage occurs.

Figure 1:
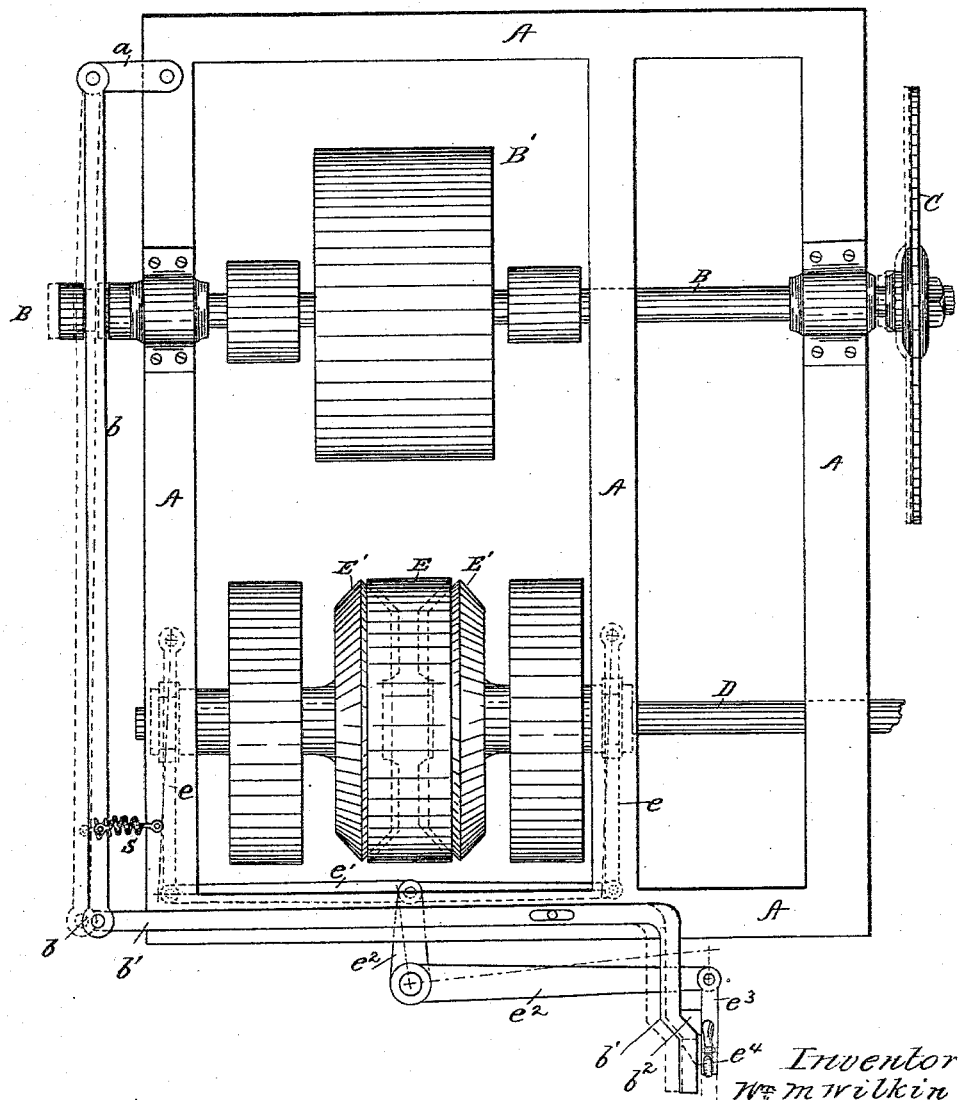
Figure 2:
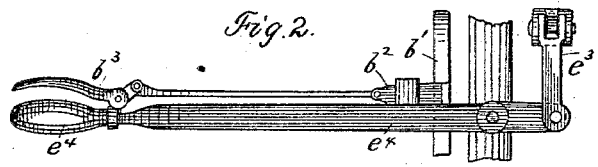

My device is shown in the accompanying drawings, as follows:

Figure 1 is a top or plan view of the frame on which the saw is mounted. The log-carriage is not shown. Fig. 2 is a side view of the sawyer's feed and gig lever.

A A A is the frame or husk. B is the saw-arbor. B' is the main driving-belt pulley. C is the saw. D is the rag-shaft. E E' E' are the feed and gig frictions. $e$, $e'$, $e^2$, $e^3$, and $e^4$ are the levers for shifting the frictions. $b$ is a lever, which collars onto the arbor, and is arranged to move the arbor longitudinally. S is a spring, which holds the lever $b$, so as to keep the arbor forward. $b'$ is a bar extending from the lever $b$ to a point adjacent to the sawyer's feeding and gigging lever $e^4$, where it is provided with a face at an angle to the plane in which the lever $e^4$ vibrates. $b^2$ is a block on the lever $e^4$, which has an inclined face corresponding with that on the bar $b'$. $b^3$ is a hand grip-lever on the lever $e^4$, by which the block $b^2$ can be raised up or let down at the pleasure of the sawyer.

It makes no difference what style of feed and gig gears are used, for whatever they may be they will be operated by a lever similar to the lever $e^4$; and it is from this lever that I operate the arbor-lever $b$, and the same or similar devices can be used regardless of the kind of feed and gig devices employed. The lever $b$ is operated by a longitudinal movement of the bar $b'$, and this is obtained by allowing the block $b^2$ to act on the inclined surface of the bar $b'$ as the lever $e^4$ is drawn back, which will shove the bar $b'$ away from lever $e^4$, and so move the lever $b$ into the position shown by dotted lines. This gearing is only used when the sawyer desires to draw the saw away from the face of the cant when gigging the carriage. When the saw is not so drawn back, it is free to be pushed back by the action of the cant upon it when gigging.

While the saw is feeding, if for any reason it is deflected or deviated, it will not bind, as it can give away by pushing back its arbor, and consequently it will not become overheated by friction.

What I claim as new is—

1. In a circular-saw mill, the combination, with the saw C, of an arbor, B, mounted, as shown, to have longitudinal play, the lever $b$, collared on said arbor, and adapted, as shown, to move it longitudinally, the spring S, connected with said lever, and operating, as shown, to flexibly hold said arbor at one extremity of its longitudinal traverse.

2. In a circular-saw mill, the combination, with the saw C, of an arbor, B, mounted, as shown, to have longitudinal play, the lever $b$, collared on said arbor, and adapted, as shown, to move it longitudinally, the spring S, connected with said lever, and operating, as shown, to flexibly hold said arbor at one extremity of its longitudinal traverse, and means, substantially as shown, for moving said lever from the feed and gig lever $e^1$.

In testimony whereof I affix my signature in presence of two witnesses.

WILLIAM M. WILKIN.

Witnesses:
  JNO. K. HALLOCK,
  ROBT. H. PORTER.